United States Patent
Yang et al.

(10) Patent No.: US 9,354,477 B2
(45) Date of Patent: May 31, 2016

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Ji Seong Yang, Seoul (KR); Dae Ho Lee, Seoul (KR); Yong Seok Kim, Seoul (KR); Han Joon Yoo, Seoul (KR); Seon Uk Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 54 days.

(21) Appl. No.: 14/251,319

(22) Filed: Apr. 11, 2014

(65) Prior Publication Data

US 2015/0138478 A1 May 21, 2015

(30) Foreign Application Priority Data

Nov. 19, 2013 (KR) .................... 10-2013-0140768

(51) Int. Cl.
*G02F 1/136* (2006.01)
*G02F 1/1362* (2006.01)
*G02F 1/1341* (2006.01)
*G02F 1/1333* (2006.01)

(52) U.S. Cl.
CPC .... *G02F 1/136209* (2013.01); *G02F 1/133377* (2013.01); *G02F 1/1341* (2013.01); *G02F 1/133345* (2013.01); *G02F 2001/136222* (2013.01)

(58) Field of Classification Search
CPC .................. G02F 1/136209; G02F 1/133512
USPC ........................................................ 349/44
See application file for complete search history.

(56) References Cited

U.S. PATENT DOCUMENTS

| 5,122,225 | A | 6/1992 | Douglas |
| 7,838,351 | B2 | 11/2010 | Toyota et al. |
| 2012/0062448 | A1 | 3/2012 | Kim et al. |
| 2013/0087801 | A1 | 4/2013 | Kurita |
| 2013/0093985 | A1 | 4/2013 | Kang et al. |
| 2013/0112979 | A1 | 5/2013 | Nam et al. |
| 2013/0250220 | A1* | 9/2013 | Kim ............... G02F 1/1341 349/123 |
| 2014/0347611 | A1* | 11/2014 | Kim et al. .......... 349/106 |

FOREIGN PATENT DOCUMENTS

| JP | 2001-183680 A | 7/2001 |
| JP | 2008-033117 A | 2/2008 |
| JP | 2008-242031 A | 10/2008 |
| JP | 2009-103769 A | 5/2009 |

(Continued)

*Primary Examiner* — Nathanael R Briggs
*Assistant Examiner* — William Peterson
(74) *Attorney, Agent, or Firm* — Innovation Counsel LLP

(57) ABSTRACT

A liquid crystal display includes a substrate, a thin film transistor, a first protection layer, a pixel electrode, a light blocking layer, a second protection layer, and a roof layer. The thin film transistor is disposed on the substrate. The first protection layer is disposed on the thin film transistor. The pixel electrode is disposed on the first protection layer. The light blocking layer is disposed on the pixel electrode to cover the thin film transistor. The second protection layer is disposed on the light blocking layer. The roof layer is disposed to face the pixel electrode, wherein a plurality of microcavities having injection holes are formed between the pixel electrode and the roof layer. The microcavities comprise liquid crystal molecules, and the first protection layer and the second protection layer have different etch rates.

20 Claims, 21 Drawing Sheets

(56) References Cited

FOREIGN PATENT DOCUMENTS

| | | |
|---|---|---|
| JP | 2009-122601 A | 6/2009 |
| KR | 10-0688958 B1 | 2/2007 |
| KR | 10-2008-0049193 A | 6/2008 |
| KR | 10-2012-0048434 A | 5/2012 |

* cited by examiner

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2013-0140768 filed in the Korean Intellectual Property Office on Nov. 19, 2013, the entire contents of which are incorporated herein by reference.

BACKGROUND (a) Field

The preset application relates to a liquid crystal display and a manufacturing method thereof.

(b) Description of the Related Art

A liquid crystal display as one of flat panel display devices that are being widely used includes two display panels, wherein field generating electrodes such as a pixel electrode and a common electrode are formed with a liquid crystal layer interposed therebetween.

The liquid crystal display generates an electric field in a liquid crystal layer by applying a voltage to the field generating electrodes to determine orientations of liquid crystal molecules of the liquid crystal layer and control polarization of incident light, thereby displaying an image.

A technique of forming a cavity in a pixel and filling the cavity with liquid crystals to implement a display has been developed for one of the liquid crystal displays. Although two sheets of substrates are used in a conventional liquid crystal display, this technique forms constituent elements on one substrate, thereby reducing weight, thickness, and the like of the device.

In the manufacturing process of a display which forms a plurality of microcavities, for repair of the thin film transistor, a light blocking member may be opened in a thin film transistor formation region. To prevent light leakage that may be generated in the thin film transistor formation region where the light blocking member is opened, an additional light blocking layer may be formed after forming the pixel electrode.

However, in a following process such as an ashing process to form the microcavities, the described light blocking layer may be damaged.

The above information disclosed in this Background section is only for enhancement of understanding of the background and therefore it may comprise information that does not form the prior art that is already known in this country to a person of ordinary skill in the art.

SUMMARY

Embodiments have been made in an effort to provide a liquid crystal display and a manufacturing method thereof, having features of including a light blocking layer which is not damaged by a following process.

Further, embodiments have been made in an effort to provide a liquid crystal display and a manufacturing method thereof, having features of preventing undercutting from being generated when a protection layer for capping a light blocking layer is etched in the liquid crystal display which forms a plurality of microcavities.

An exemplary embodiment provides a liquid crystal display including a substrate, a thin film transistor, a first protection layer, a pixel electrode, a light blocking layer, a second protection layer, and a roof layer. The thin film transistor is disposed on the substrate. The first protection layer is disposed on the thin film transistor. The pixel electrode is disposed on the first protection layer. The light blocking layer is disposed on the pixel electrode to cover the thin film transistor. The second protection layer is disposed on the light blocking layer. The roof layer is disposed to face the pixel electrode, wherein a plurality of microcavities having injection holes are formed between the pixel electrode and the roof layer. The microcavities comprise liquid crystal molecules, and the first protection layer and the second protection layer have different etch rates.

The first protection layer and the second protection layer may comprise different materials.

The second protection layer may have high etch selectivity as compared with the first protection layer.

The first protection layer may include a silicon oxide (SiOx) and the second protection layer may include a silicon nitride (SiNx).

The liquid crystal display may further include an interlayer insulating layer disposed between the thin film transistor and the pixel electrode. The pixel electrode and the thin film transistor may be connected to each other through a contact hole formed penetrating through the interlayer insulating layer and the first protection layer.

The second protection layer may have a wider width than that of the light blocking layer to cover the light blocking layer.

The liquid crystal display may further include a light blocking member disposed between the thin film transistor and the interlayer insulating layer, and the light blocking member may have an open portion corresponding to the thin film transistor.

The liquid crystal display may further include a color filter disposed between the thin film transistor and the interlayer insulating layer.

The liquid crystal display may further include a capping layer disposed on the roof layer to cover the injection hole.

The liquid crystal display may further include a common electrode disposed between the microcavities and the roof layer.

Another embodiment provides a manufacturing method of a liquid crystal display as follows. A thin film transistor is formed on a substrate. A first protection layer is formed on the thin film transistor. A pixel electrode is formed on the first protection layer. A light blocking layer is formed on the pixel electrode to cover the thin film transistor. A second protection layer is formed on the light blocking layer. A sacrificial layer is formed an the pixel electrode. A roof layer is formed on the sacrificial layer. A plurality of microcavities having injection holes are formed by removing the sacrificial layer. A liquid crystal material is injected into the microcavities, wherein the first protection layer and the second protection layer have different etch rates.

The forming of the second protection layer may include: forming a protection material layer on the pixel electrode to cover the light blocking layer; and patterning the protection material layer to form the second protection layer.

The second protection layer may have high etch selectivity as compared with the first protection layer.

The first protection layer may include a silicon oxide (SiOx) and the second protection layer may include a silicon nitride (SiNx).

The manufacturing method may further include forming an interlayer insulating layer between the thin film transistor and the pixel electrode. The pixel electrode and the thin film transistor may be connected to each other through a contact hole formed penetrating through the interlayer insulating layer and the first protection layer.

The second protection layer may be formed to have a wider width than that of the light blocking layer to cover the light blocking layer.

The manufacturing method may further include forming a light blocking member between the thin film transistor and the interlayer insulating layer. The light blocking member may be formed to have an open portion corresponding to the thin film transistor.

The manufacturing method may further include forming a color filter between the thin film transistor and the interlayer insulating layer.

The manufacturing method may further include forming a capping layer on the roof layer to cover the injection holes.

The manufacturing method may further include forming a common electrode between the microcavities and the roof layer.

In accordance with the exemplary embodiments, the light blocking layer formed after the pixel electrode is covered with the protection layer, and thus the light blocking layer is not damaged in a strip process for forming the microcavities.

Further, in accordance with the exemplary embodiments, it is possible to prevent undercutting from being generated when the protection layer is etched for the light blocking layer by using the etch selectivity of the protection layer for capping the organic layers disposed with the pixel electrode therebetween and the protection layer for capping the light blocking layer in the liquid crystal display which forms the microcavities.

DETAILED DESCRIPTION OF THE EMBODIMENTS

Figure 1:
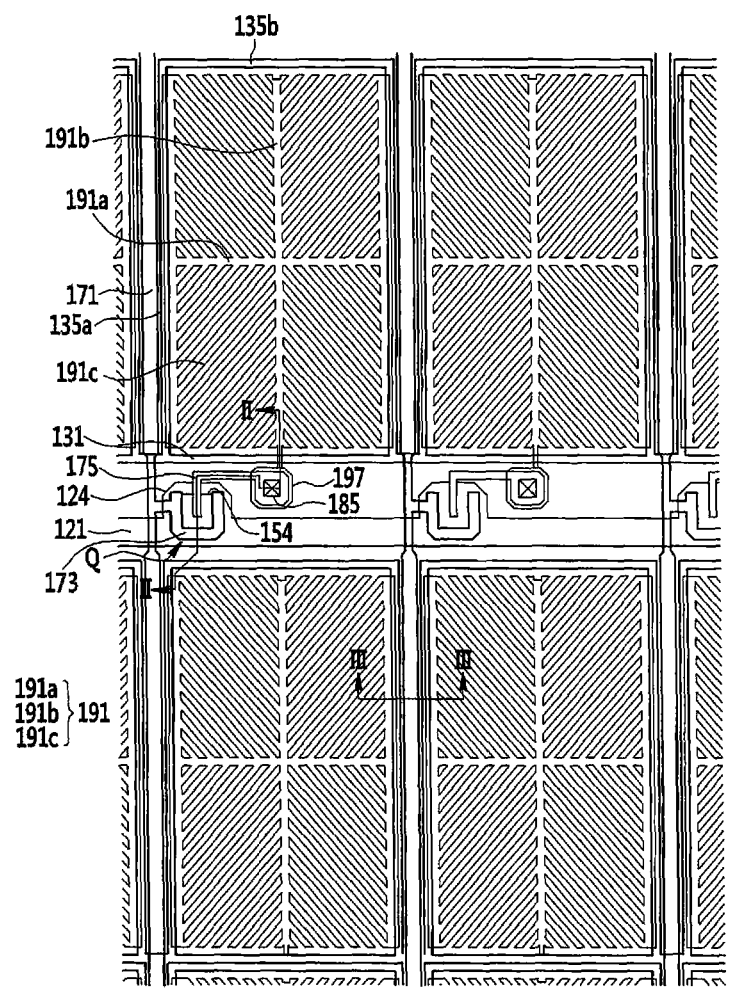
FIG. 1 is a top plan view showing a liquid crystal display in accordance with an exemplary embodiment.

Hereinafter, exemplary embodiments will be described in detail with reference to the accompanying drawings. As those skilled in the art would realize, the described embodiments may be modified in various different ways, all without departing from the spirit or scope of the inventive concept. On the contrary, exemplary embodiments introduced herein are disposed to make disclosed contents thorough and complete, and sufficiently transfer the spirit of the inventive concept to those skilled in the art.

In the drawings, the thickness of layers, films, panels, regions, etc., are exaggerated far clarity. It will be understood that when a layer is referred to as being "on" another layer or substrate, it can be directly on the other layer or substrate, or intervening elements may also be present. Like reference numerals designate like elements throughout the specification.

Figure 2:
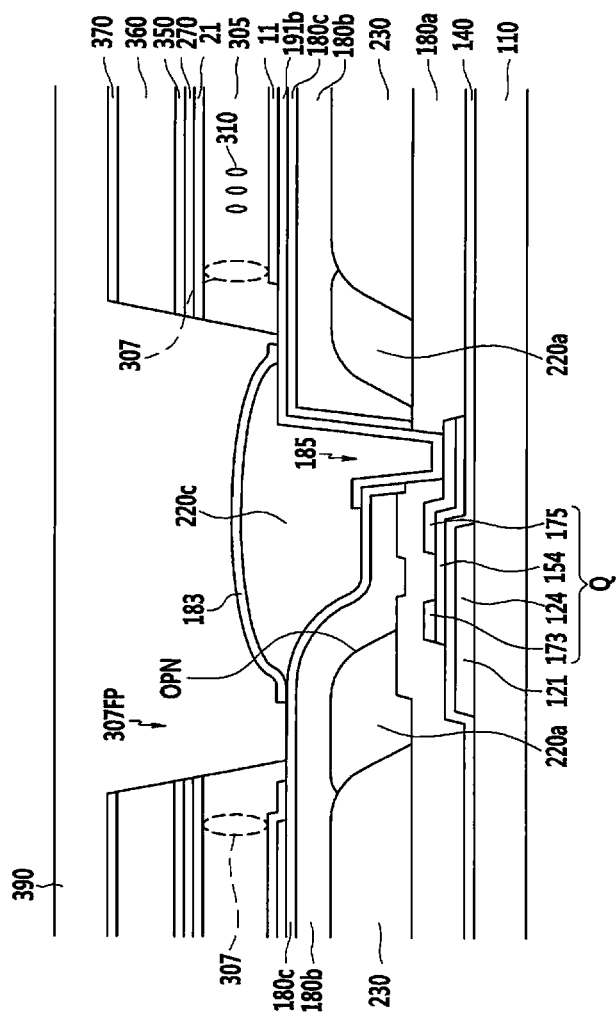
FIG. 2 is a cross-sectional view taken along a line II-II of FIG. 1.
Figure 3:
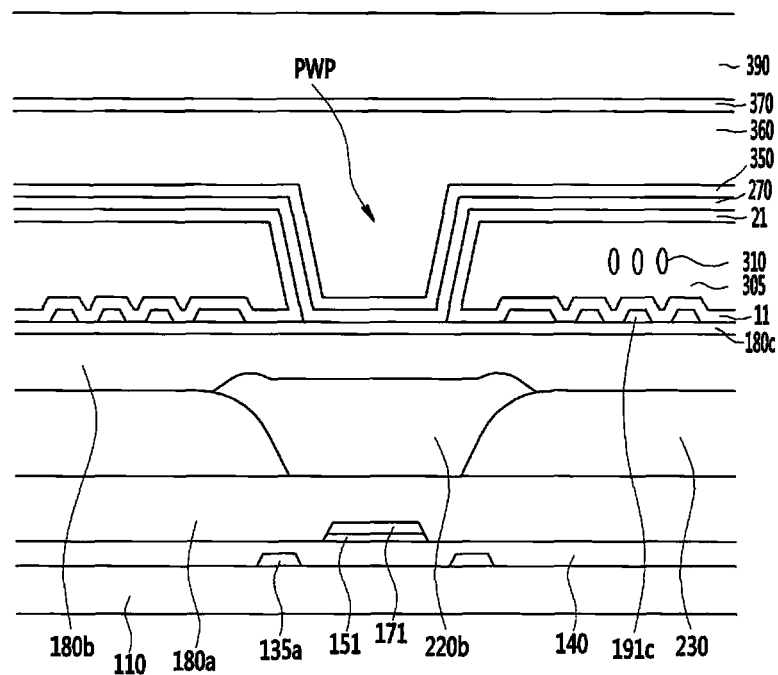
FIG. 3 is a cross-sectional view taken along a line III-III of FIG. 1.

FIG. 1 is a top plan view showing a liquid crystal display in accordance with an exemplary embodiment. FIG. 2 is a cross-sectional view taken along a line II-II of FIG. 1. FIG. 3 is a cross-sectional view taken along a line III-III of FIG. 1.

Referring to FIGS. 1 to 3, a gate line 121 and a storage electrode line 131 are formed on an insulating substrate 110 formed of transparent glass or plastic. The gate line 121 includes a gale electrode 124. The storage electrode line 131 is mainly extended in a horizontal direction, and transfers a predetermined voltage such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical storage electrode portions 135a to each other. The storage electrode portions 135a and 135b have a structure surrounding a pixel electrode 191.

A gate insulating layer 140 is formed on the gate line 121 and the storage electrode line 131. A semiconductor layer 151 positioned at a lower portion of a data line 171, and a semiconductor layer 154 positioned at a lower portion of a source/drain electrode and at a channel portion of a thin film transistor Q, are formed on the gate insulating layer 140.

A plurality of ohmic contact layers may be formed on each of the semiconductor layers 151 and 154, and between the data line 171 and the source/drain electrode, but this is omitted in the drawings.

Data conductors 171, 173, and 175 including a source electrode 173, the data line 171 connected with the source electrode 173, and a drain electrode 175 are formed on each of the semiconductor layers 151 and 154 and the gate insulating layer 140.

The gate electrode 124, the source electrode 173, and the drain electrode 175 form the thin film transistor Q together with the semiconductor layer 154, and a channel of the thin film transistor Q is formed on the portion of the semiconductor layer 154 between the source electrode 173 and the drain electrode 175.

A first interlayer insulating layer 180a is formed on the data conductors 171, 173, and 175, and an exposed portion of the semiconductor layer 154. The first interlayer insulating layer 180a may include an inorganic insulating material, such as a silicon nitride (SiNx) and a silicon oxide (SiOx), or an organic insulating material.

A color filter 230 and light blocking members 220a and 220b are formed on the first interlayer insulating layer 180a.

Each of the light blocking members 220a and 220b has a lattice structure having an opening corresponding to a region displaying an image, and is formed of a material preventing light from being transmitted therethrough. The color filter 230 is formed at openings of the light blocking members 220a and 220b.

The light blocking members 220a and 220b include a horizontal light blocking member 220a formed in a direction parallel to the gate line 121, and a vertical light blocking member 220b formed in a direction parallel to the data line 171. In the present exemplary embodiment, the horizontal light blocking member 220a has an open portion OPN corresponding to the thin film transistor Q to repair the thin film transistor Q during the manufacturing process. In other words, the open portion OPN of the horizontal light blocking member 220a may be formed with a portion corresponding to a region at which the thin film transistor Q is formed.

The color filter 230 may display one of primary colors, such as three primary colors including red, green, and blue. However, the colors are not limited to the three primary colors including red, green, and blue, and the color filter 230 may also display one among a cyan-based color, a magenta-based color, a yellow-based color, and a white-based color. The color biter 230 may be formed of materials displaying different colors for each adjacent pixel.

A second interlayer insulating layer 180b covering the color filter 230 and the light blocking members 220a and 220b is formed on the color filter 230 and the light blocking members 220a and 220b. The second interlayer insulating layer 180b may include the inorganic insulating material, such as a silicon nitride (SiNx) and a silicon oxide (SiOx), or the organic insulating material. Unlike the cross-sectional view of FIG. 2, in a case where a step is generated due to a difference in a thickness between the color filter 230 and the light blocking members 220a and 220b, the second interlayer insulating layer 180b includes an organic insulating material, so that it is possible to decrease or remove the step A first protection layer 180c is formed on the second interlayer insulating layer 180b. The first protection layer 180c may be made of an inorganic material for protecting the second interlayer insulating layer 180b. For example, the first protection layer 180c may be made of a silicon oxide (SiOx).

The interlayer insulating layers 180a and 180b and the first protection layer 180c have a contact holes 185 extending to and exposing the drain electrode 175.

The pixel electrode 191 is disposed on the first protection layer 180c. The pixel electrode 191 may be formed of a transparent conductive material such as ITO or IZO.

An overall shape of the pixel electrode 191 is a quadrangle, and the pixel electrode 191 includes cross stems configured by a horizontal stem 191a and a vertical stem 191b crossing the horizontal stem 191a. Further, the pixel electrode 191 is divided into four sub-regions by the horizontal stem 191a and the vertical stem 191b, and each subregion includes a plurality of minute branches 191c. In the present exemplary embodiment, the pixel electrode 191 may further include an outer stem surrounding an outer circumference of the pixel electrode 191.

The minute branches 191c of the pixel electrode 191 form an angle of approximately 40° to 45° with the gate line 121 or the horizontal stem 191a. Further, the minute branches 191c of two adjacent sub-regions may be perpendicular to each other. Furthermore, a width of each minute branch 191c may be gradually increased, or a distance between the minute branches 191c may be varied.

The pixel electrode 191 is physically and electrically connected to the drain electrode 175 through the contact hole 185, and receives a data voltage from the drain electrode 175.

The thin film transistor Q and the pixel electrode 191 described above are merely exemplary, and a structure of the thin film transistor and a design of the pixel electrode may be modified in order to improve side visibility.

In the present exemplary embodiment as illustrated in FIG. 2, an injection hole forming region 307FP is formed between microcavities 305 adjacent in the vertical direction. A light blocking layer 220c covering the thin film transistor Q and the contact hole 185 is formed within the injection hole forming region 307FP. The light blocking layer 220c is formed of a material capable of blocking light in order to decrease a leakage current of the thin film transistor Q by external light and prevent a decrease in a contrast ratio due to reflective light. The light blocking layer 220c may be made of an organic material. The light blocking layer 220c may be made of the same material as that of the light blocking members 220a and 220b.

A second protection layer 183 is disposed on the light blocking layer 220c. The second protection layer 183 includes a material having an etch rate that is different from that of the first protection layer 180c. The second protection layer 183 includes a silicon nitride (SiNx).

In the present exemplary embodiment, the second protection layer 183 has etch selectivity that is greater than that of the first protection layer 180c. Specifically, in the case of an etchant used in a patterning process for forming the second protection layer 183 shown in FIG. 2 in the present exemplary embodiment, the second protection layer 183 has etch selectivity that is very high compared with the first protection layer 180c. Accordingly, it is possible to selectively etch the second protection layer 183 while minimizing etching of the first projection layer 180c. Therefore, it is possible to prevent generation of undercutting caused by the etching of the first protection layer 180c below the pixel electrode 191 in the process for forming the second protection layer 183.

Hereinafter, etch selectivities of the first protection layer 180c and the second protection layer 183 will be described with reference to FIG. 21.

Figure 21:
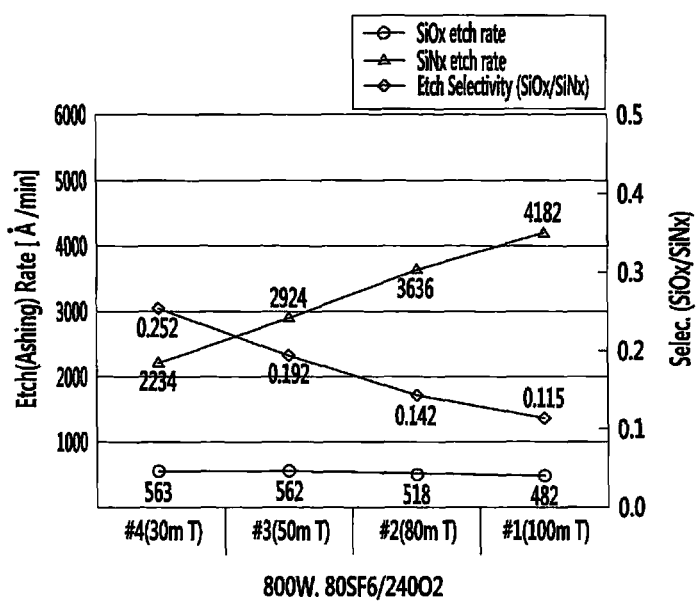
FIG. 21 is a graph showing an etch rate and etch selectivity of a silicon oxide and a silicon nitride.

FIG. 21 is a graph showing an etch rate and etch selectivity of silicon oxide and silicon nitride.

Referring to FIG. 21, the etch rain of silicon nitride is higher than of the silicon oxide, and the etch selectivity of the silicon oxide is equal to or smaller than 0.25 as compared with the silicon nitride. In the graph of FIG. 21, the horizontal axis indicates a process pressure (unit: mTorr), and SF6/O2 is employed as the etching gas. As such, since the difference between the etch rates of the silicon oxide and silicon nitride is large, a target material can be selectively etched. The silicon oxide and the silicon nitride are examples of the materials of the first protection layer 180c and the second protection layer 183, and may be replaced by a combination of materials having different etch rates.

Referring to FIG. 2 again, it is preferable that the second protection layer 183 has a wider width than that of the light blocking layer 220c to completely cover the light blocking layer 220c. The second protection layer 183 can serve to prevent the light blocking layer 220c from being damaged in the manufacturing process of the liquid crystal display in accordance with the present exemplary embodiment.

A lower alignment layer 11 is formed on the pixel electrode 191, and may be a vertical alignment layer. The lower alignment layer 11, as a liquid crystal alignment layer made of a material such as polyamic acid, polysiloxane, polyimide, or the like, may include at least one of generally used materials.

An upper alignment layer 21 is positioned at a portion facing the lower alignment layer 11, and the microcavity 305 is formed between the lower alignment layer 11 and the upper alignment layer 21. A liquid crystal material including liquid crystal molecules 310 is injected into the microcavity 305 through an injection hole 307. The microcavity 305 may be formed in a column direction, that is, a vertical direction, of the pixel electrode 191. In the present exemplary embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of injection hole forming regions 307FP positioned at a portion overlapping the gate line 121, and a plurality of microcavities 305 may be formed along the direction in which the gate line 121 is extended. Bach of the plurality of formed microcavities 305 may correspond to a pixel area, and the pixel areas may correspond to a region displaying an image.

In the present exemplary embodiment, since the liquid crystal material is injected through the injection hole 307 of the microcavity 305, it is possible to form the liquid crystal display without forming a separate upper substrate.

A common electrode 270 and a lower instating layer 350 are positioned on the upper alignment 21. The common electrode 270 receives the common voltage, and generates an electric field together with the pixel electrode 191 to which the data voltage is applied to determine a direction in which the liquid crystal molecules 310 positioned at the microcavity 305 between the two electrodes are inclined. The common electrode 270 forms a capacitor with the pixel electrode 191 to maintain the received voltage even after the thin film transistor is turned off. The lower insulating layer 350 may be formed of a silicon nitride (SiNx) or a silicon oxide (SiOx).

In the present exemplary embodiment, it is described that the common electrode 270 is formed on the microcavity 305, but in another exemplary embodiment, the common electrode 270 is formed under the microcavity 305, so that liquid crystal driving according to a coplanar electrode (CE) models possible.

A roof layer 360 is positioned on the lower insulating layer 350. The roof layer 360 serves as a support so that the microcavity 305, which is a space between the pixel electrode 191 and the common electrode 270, is formed. The roof layer 360 may include silicon oxycarbide (SiOC), a photoresist, or other organic materials. In the case where the roof layer 360 includes the silicon oxycarbide (SiOC), the roof layer 360 may be formed by a chemical vapor deposition method, and in the case where the roof layer 360 includes the photoresist, the roof layer 360 may be formed by a coating method. The silicon oxycarbide (SiOC) has high transmittance among films formable by the chemical vapor deposition method, and has low film stress, thereby achieving a feature that the roof layer 360 is not deformed. Accordingly, in the present exemplary embodiment, when the roof layer 360 is formed of silicon oxycarbide (SiOC), a stable film through which light is transmitted well may be formed.

An upper insulating layer 370 is disposed on the roof layer 360. The upper insulating layer 370 may be brought into contact with an upper surface of the roof layer 360. The upper insulating layer 370 may be formed of a silicon nitride (SiNx) or a silicon oxide (SiOx). A capping layer 300 is disposed on the upper insulating layer 370. The capping layer 390 is in contact with an upper surface and a side surface of the upper insulating layer 370, and the capping layer 390 covers the injection hole 307 of the microcavity 305 exposed by the injection hole forming region 307FP. The capping layer 390 may be formed of a thermosetting resin, silicon oxycarbide (SiOC), or graphene.

In the case where the capping layer 390 is formed of graphene, because the graphene has a characteristic of high impermeability for gas including helium, it may serve as a capping layer blocking the injection hole 307, and because the graphene is a material formed by a carbon bond, the liquid crystal material is not contaminated even though graphene is brought into contact with the liquid crystal material. In addition, graphene may serve to protect the liquid crystal material from external oxygen and moisture.

An overcoat layer (not illustrated) formed of an inorganic layer or an organic layer may be positioned oh the capping layer 390. The overcoat layer serves to protect the liquid crystal molecules 310 injected to the microcavity 305 from an external impact, and planarize the layer.

The capping layer 390 may cover the light blocking layer 183 as well as the injection hole 307 and may be filled in the injection hole forming region 307FP between the microcavities 303 and the light blocking layer 183.

In the present exemplary embodiment as shown in FIG. 3, a partition wall formation portion PWP is positioned between the microcavities 305 adjacent to each other in a horizontal direction. The partition wall formation portion PWP may be formed in an extending direction of the data line 171, and may be covered by the roof layer 360. The lower insulating layer 350, the common electrode 270, the upper insulating layer 370, and the roof layer 360 are filled in the partition wall formation portion PWP, and the structure forms the partition wall to partition or define the microcavity 305. In the present exemplary embodiment, since a partition wall structure such as the partition wall formation portion PWP exists between the microcavities 305, even if the insulation substrate 110 is bent, generated stress is small, and a change degree of a cell gap may be considerably reduced.

A polarizer (not shown) is disposed below the substrate 110 and above the capping layer 390. The polarizer may include a polarizing element generating polarized light and a tri-acetyl-cellulose (TAC) layer for securing durability, and depending on an exemplary embodiment directions of transmissive axes of an upper polarizer and a lower polarizer may be perpendicular or parallel to each other.

Hereinafter, a manufacturing method of the aforementioned liquid crystal display will be described with reference to FIG. 4 to FIG. 20 in accordance with another exemplary embodiment The following exemplary embodiment may be modified into other methods as an exemplary embodiment of the manufacturing method.

FIG. 4 to FIG. 20 are stepwise cross-sectional views showing the manufacturing method of the liquid crystal display in accordance with the present exemplary embodiment. FIGS. 4, 5, 6, 7, 8, 9, 10, 12, 14, 16, 17, and 19 sequentially show the cross-sectional views taken along the line II-II of FIG. 1. FIGS. 11, 13, 15, 18, and 20 sequentially show the cross-sectional views taken along the line III-III of FIG. 1.

Figure 4:
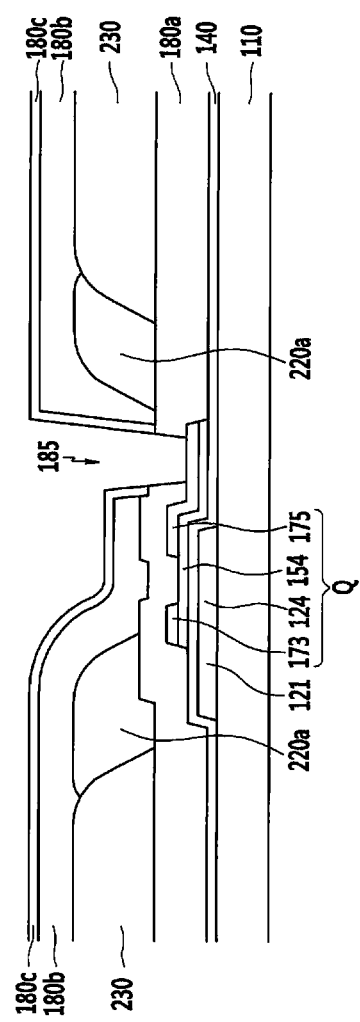
FIGS. 4, 5, 6, 7, 8, 9, 10, 11, 12, 13, 14, 15, 16, 17, 18, 19, 20 are stepwise cross-sectional views showing a manufacturing method of a liquid crystal display in accordance with another exemplary embodiment.

Referring to FIG. 4, in order to form a generally known switching element on a substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 173 are formed. In this case, the data line 171 connected with the source electrode 173 may be formed in be extended in the vertical direction while crossing the gate line 121.

The first interlayer insulating layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first interlayer insulating layer 180a, and the light blocking members 220a and 220b are formed between the color filters 230. The light blocking members 220a and 220b include the horizontal light blocking member 220a formed in a direction parallel to the gate line 121 and the vertical light blocking member 220b formed in a direction parallel to the data line 171.

In this case, the horizontal light blocking member 220a is formed to open the thin film transistor Q to repair the thin film transistor Q in the manufacturing process.

The second interlayer insulating layer 180b and the first protection layer 180c are formed to cover the color filter 230 and the light blocking members 220a and 220b, and the second interlayer insulating layer 180b and the first protection layer 180c are formed to have the contact hole 185 electrically and physically connecting the pixel electrode 191 and the drain electrode 175.

Figure 5:
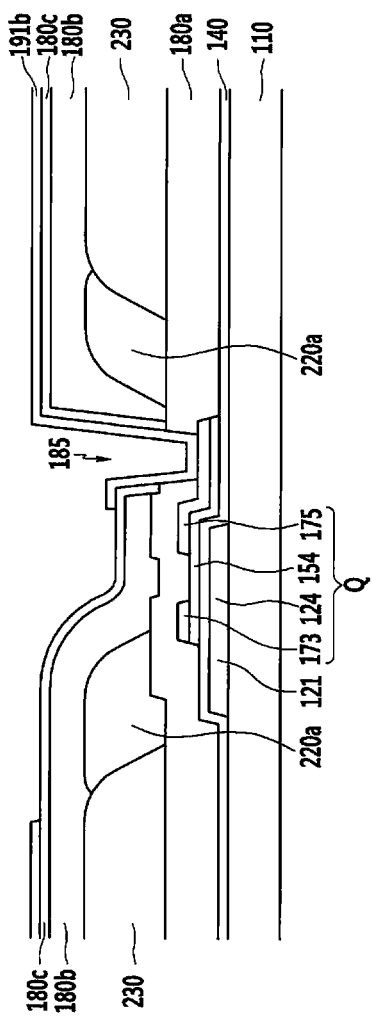

Referring to FIG. 5, the pixel electrode 191 is formed on the second interlayer insulating layer 180b. At this time, as in the exemplary embodiment described with reference to FIG. 1 to FIG. 3, the pixel electrode 191 is formed to have the cross stems 191a and 191b and the minute branches 191c by using a photolithography process after being coated with a transparent conductive material such as ITO or IZO.

Figure 6:
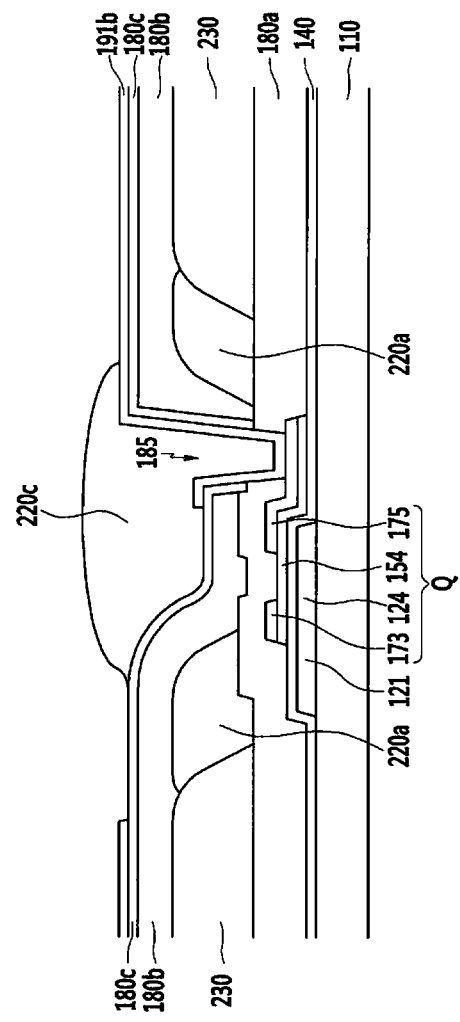

Referring to FIG. 6, the light blocking layer 220c is formed on the pixel electrode 191 and the first protection layer 180c. Further, the light blocking layer 220c is formed in such a way so as to cover the thin film transistor Q and the contact hole 185. When a fault is generated in the thin film transistor Q, a repair process of the thin film transistor Q may be performed before a forming process of the light blocking layer 220c.

Figure 7:
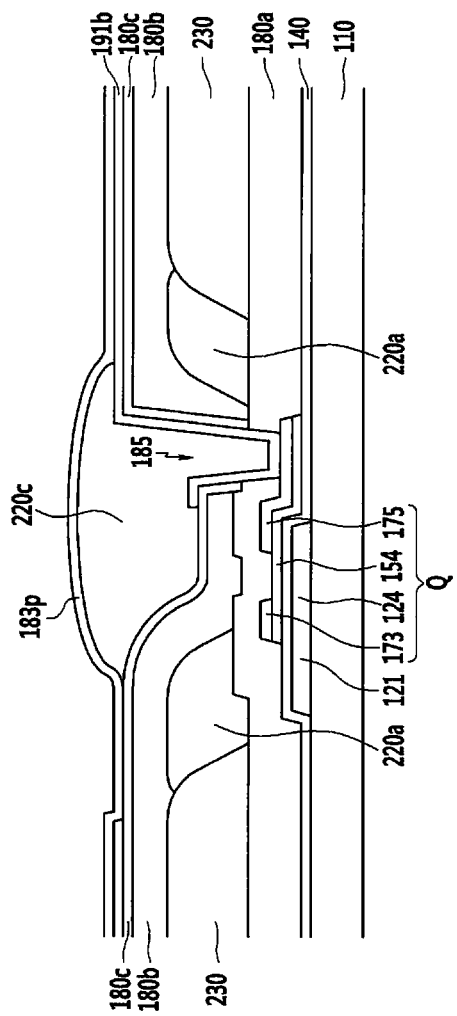

Referring to FIG. 7, a protection material layer 183p is formed on the light blocking layer 220c, the pixel electrode 191, and the first protection layer 180c. The protection material layer 183p may be made of an inorganic material such as a silicon nitride.

Figure 8:
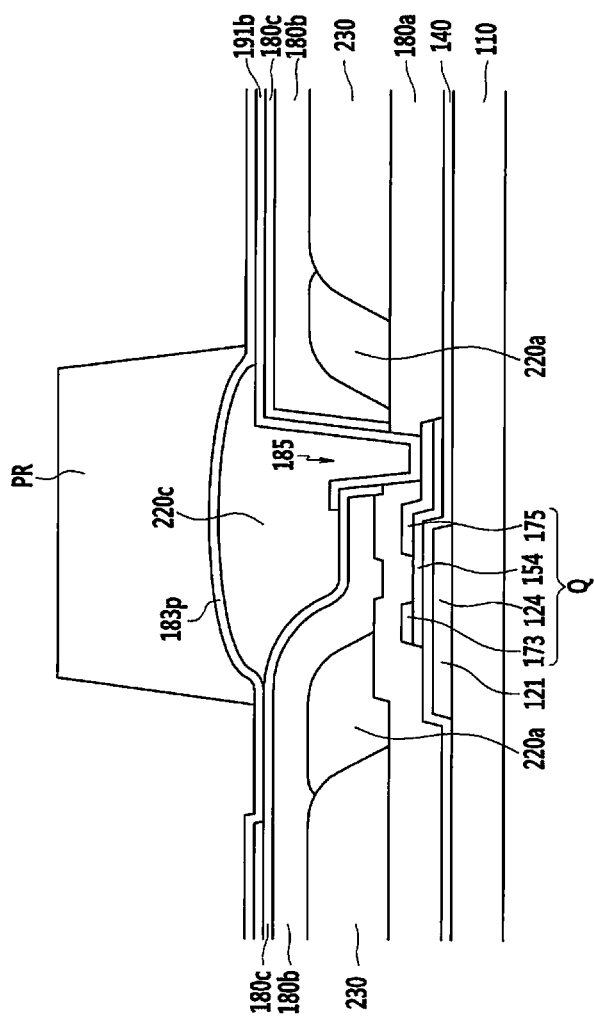

Referring to FIG. 8, a photosensitive film pattern PR is formed on the protection material 183p. The photosensitive film pattern PR may be formed on the substrate 110 to cover the thin film transistor Q and the contact hole 185, and may be formed by using a positive photoresist.

Figure 9:
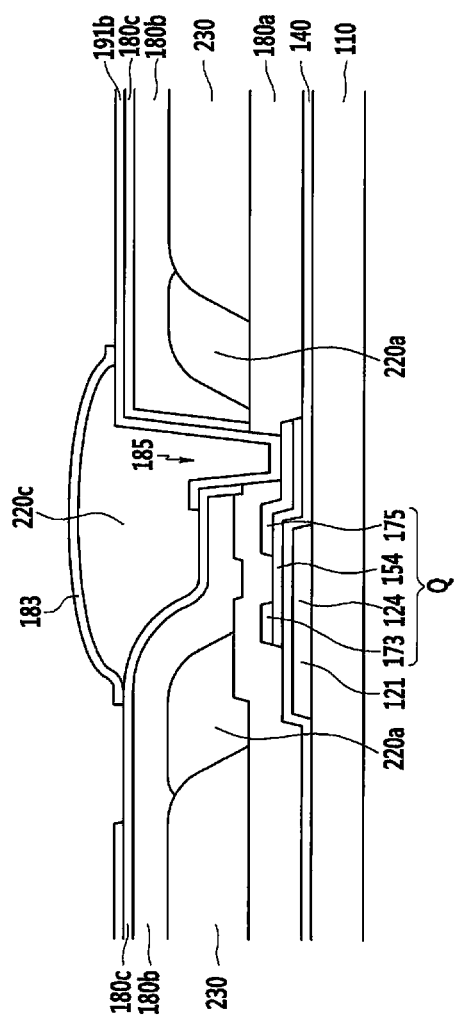

Referring to FIG. 9, the protection material layer 183p is patterned by using the photosensitive film pattern PR as a mask. In this case, the second protection layer 183 is formed to cover the thin film transistor Q and the contact hole 185. In the present exemplary embodiment, the protection material layer 183p and thus the second protection layer 183 has etch selectivity that is very high compared with the first protection layer 180c. Accordingly, it is possible to selectively etch the protection material layer 183p to form the second protection layer 183 while minimizing etching of the first protection layer 180c. Therefore, it is possible to prevent generation of undercutting caused by the etching of the first protection layer 180c below the pixel electrode 191 in the process for forming the second protection layer 183.

Figure 10:
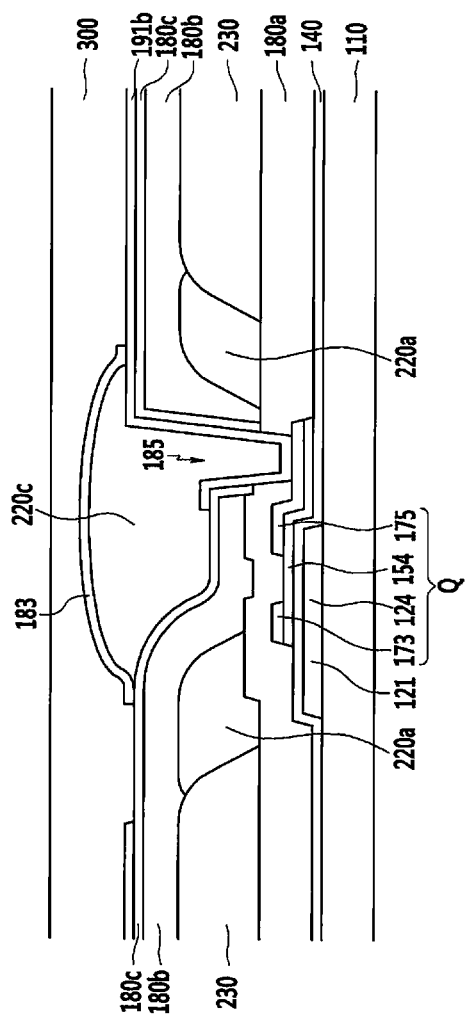
Figure 11:
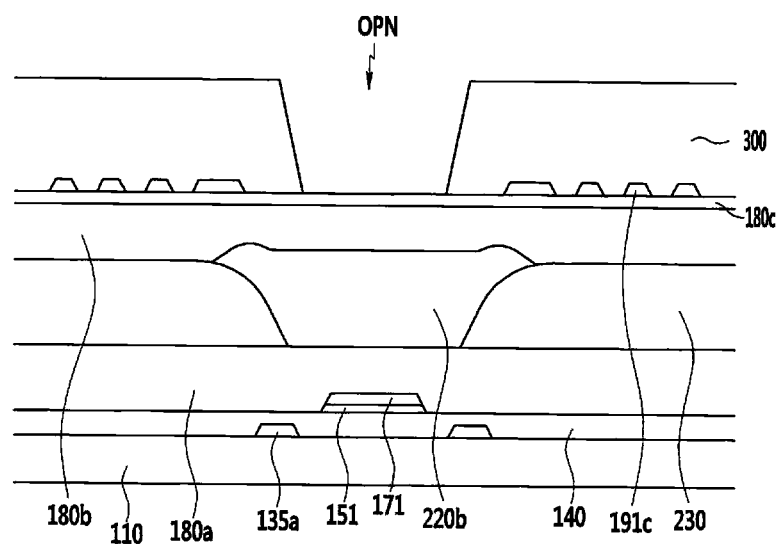

Referring to FIG. 10 and FIG. 11, the remaining photosensitive film pattern PR is removed through a strip process, and a sacrificial layer 300 is formed on the pixel electrode 191 and the second protection layer 183. The sacrificial layer 300 may be made of an organic material. As shown in FIG. 11, the open portion OPN is formed along a direction parallel with the data line 171 in the sacrificial layer 300. In a subsequent process, the common electrode 270, the lower insulating layer 350, the roof layer 360, and the upper insulating layer 370 are filled in the open portion OPN to form the partition wall formation portion PWP.

Figure 12:
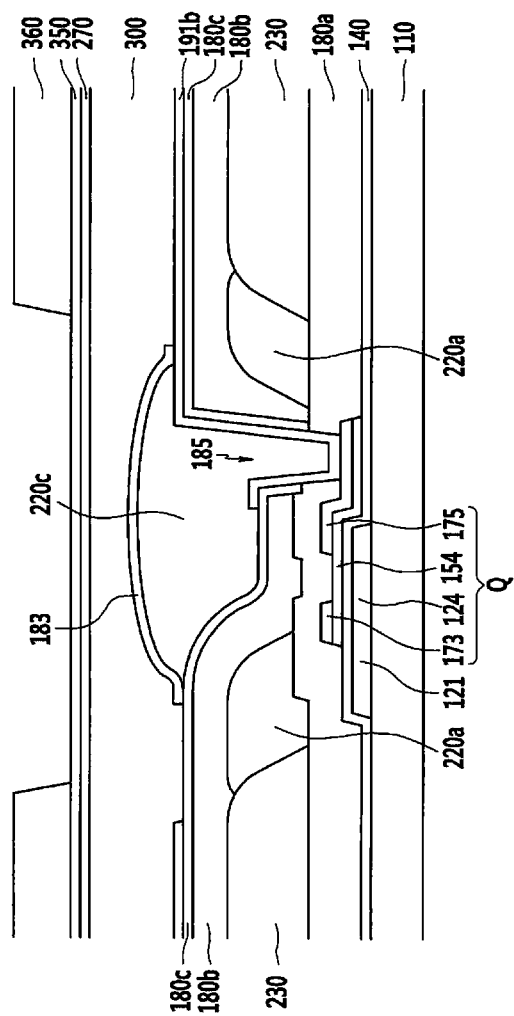
Figure 13:
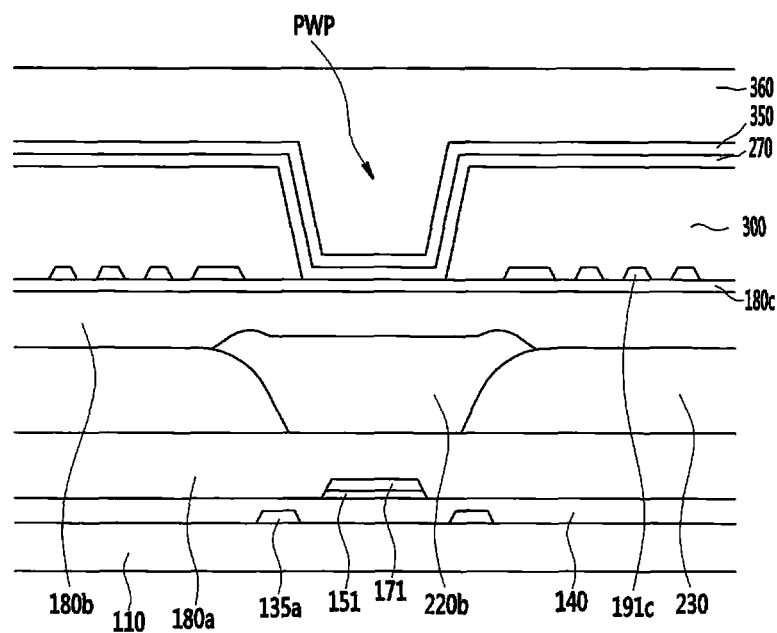

Referring to FIG. 12 and FIG. 13, the common electrode 270, the lower insulating layer 350, and the roof layer 360 are sequentially formed on the sacrificial layer 300. The roof layer 360 may be removed at the region corresponding to the horizontal light blocking member 220a positioned between the pixel areas adjacent in the vertical direction by an exposure and development process. The roof layer 360 exposes the lower insulating layer 350 in the region corresponding to the horizontal light blocking member 220a. In this case, the common electrode 270, the lower insulating layer 350, and the roof layer 360 fill the open portion OPN formed above the vertical light blocking member 220b thereby forming the partition forming portion PWP.

Figure 14:
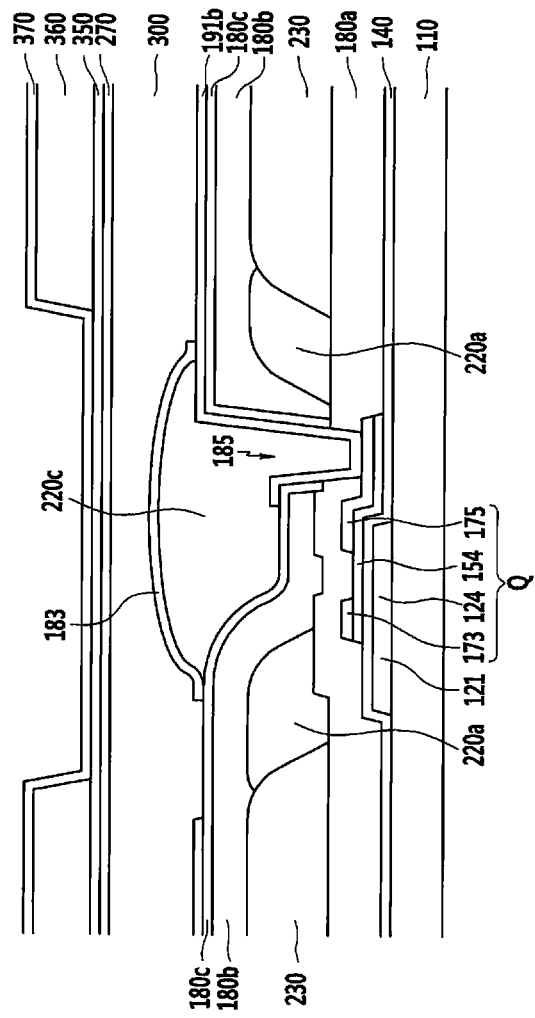
Figure 15:
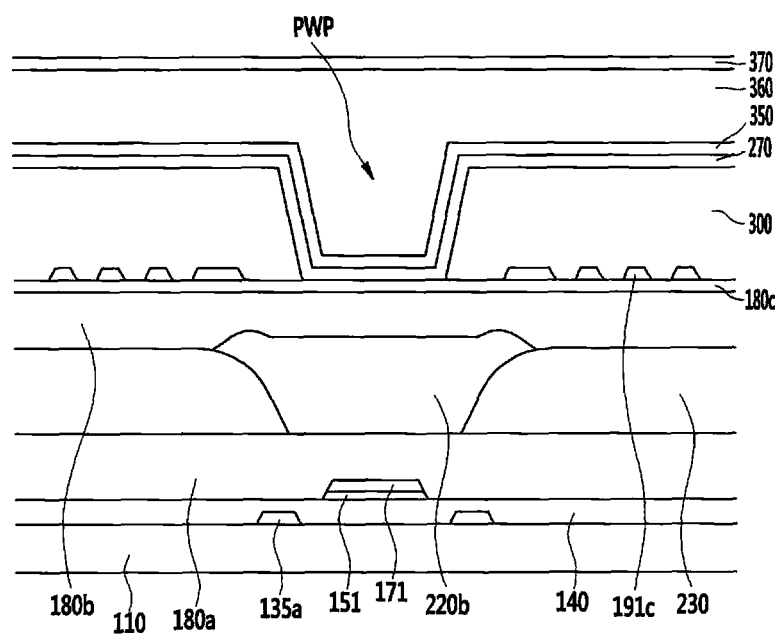

Referring to FIG. 14 and FIG. 15, the upper insulating layer 370 is formed in such a way so as to cover upper portions of the roof layer 360 and the exposed lower insulating layer 350.

Figure 16:
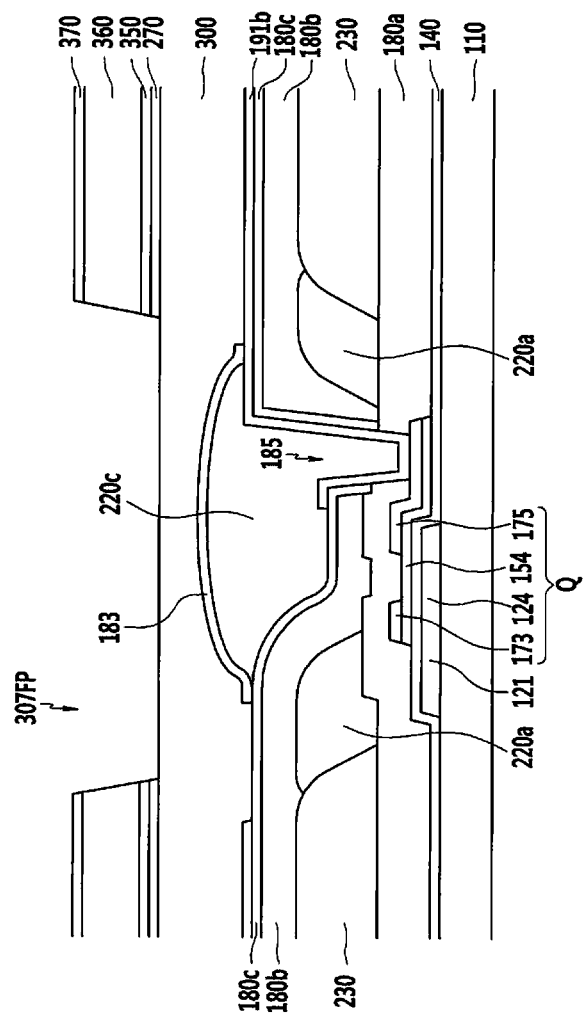

Referring to FIG. 16, the upper insulating layer 370, the lower insulating layer 350, and the common electrode 270 are dry-etched to partially remove the upper insulating layer 370, the lower insulating layer 350, and the common electrode 270, thereby forming the injection hole forming region 307FP. To this case, the sacrificial layer 300 is exposed to the outside.

As shown in FIG. 16, the liquid crystal display is formed such that the upper insulating layer 370 which covers the side surface of the roof layer 360 is removed to expose a side surface of the roof layer 360 to the outside, but it is not limited thereto. Alternatively, the liquid crystal display may be formed such that the upper insulating layer 370 is formed to cover the side surface of the roof layer 360.

Figure 17:
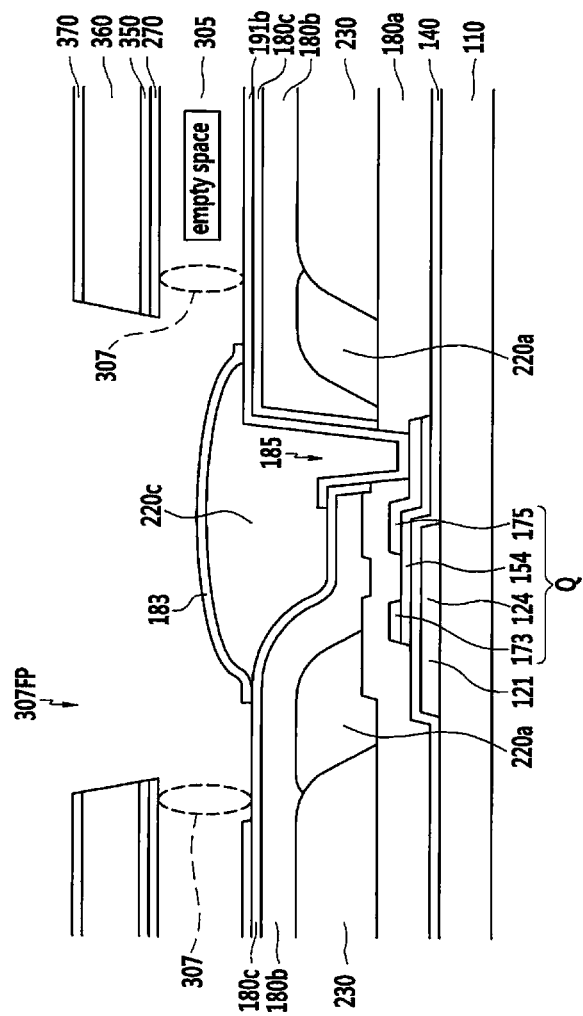
Figure 18:
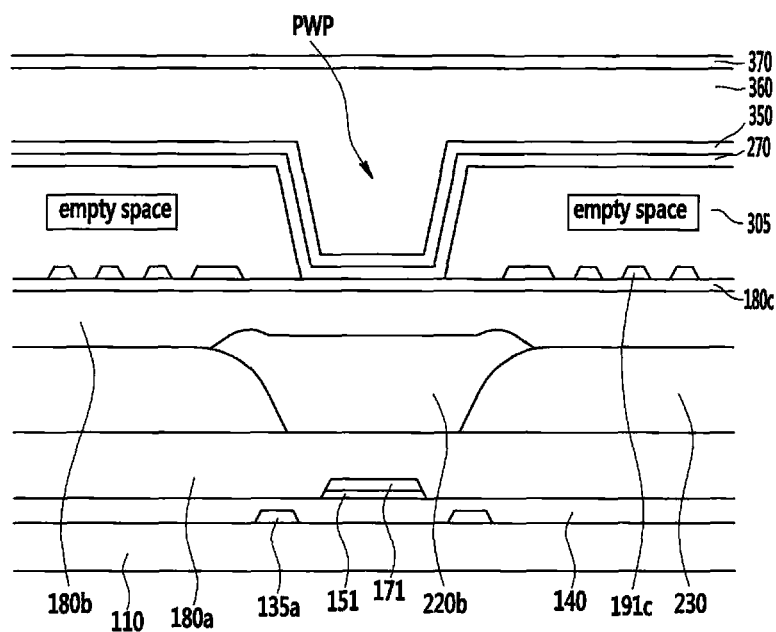

Referring to FIG. 17 and FIG. 18, the sacrificial layer 300 is removed by an oxygen (O2) ashing process or a wet-etching method through the injection hole forming region 307FP. In this case, the microcavities 305 having the injection holes 307 are formed.

The microcavities 305 are in a state of an empty space according to the removal of the sacrificial layer 300. The injection holes 307 may be formed along a direction in which the gate line 121 is extended. In the case that the sacrificial layer 300 is made of a material that is similar or identical to that of the light blocking layer 220c, the light blocking layer 220c may be damaged in the removing process of the sacrificial layer 300. As a result, the light blocking layer 220c cannot cover the thin film transistor Q and the contact hole 185I thereby deteriorating reliability of the liquid crystal display. However, in the present exemplary embodiment, the light blocking layer 220c is surrounded by the second protection layer 183, and thus it is possible to prevent damage to the light blocking layer 220c in the removing process of the sacrificial layer 300.

Figure 19:
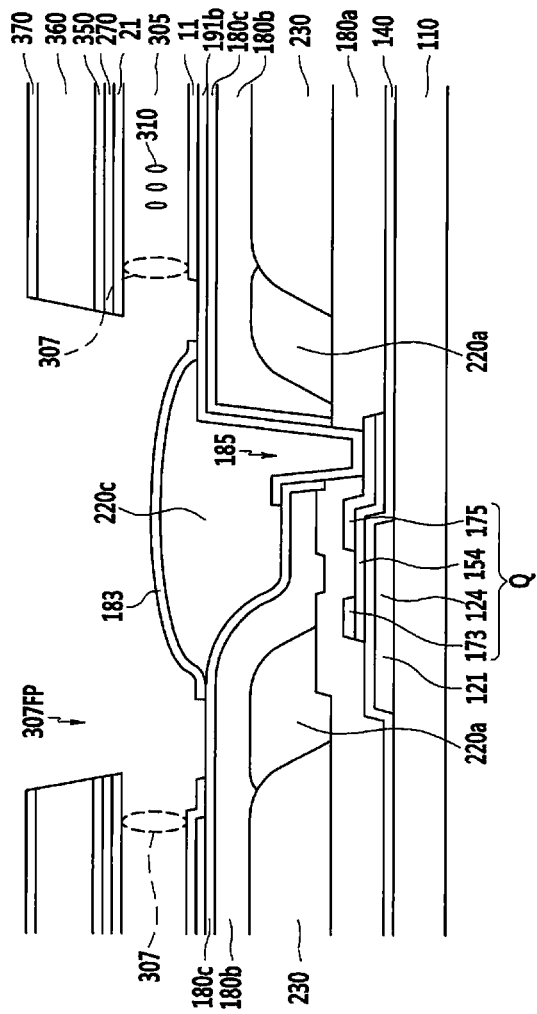
Figure 20:
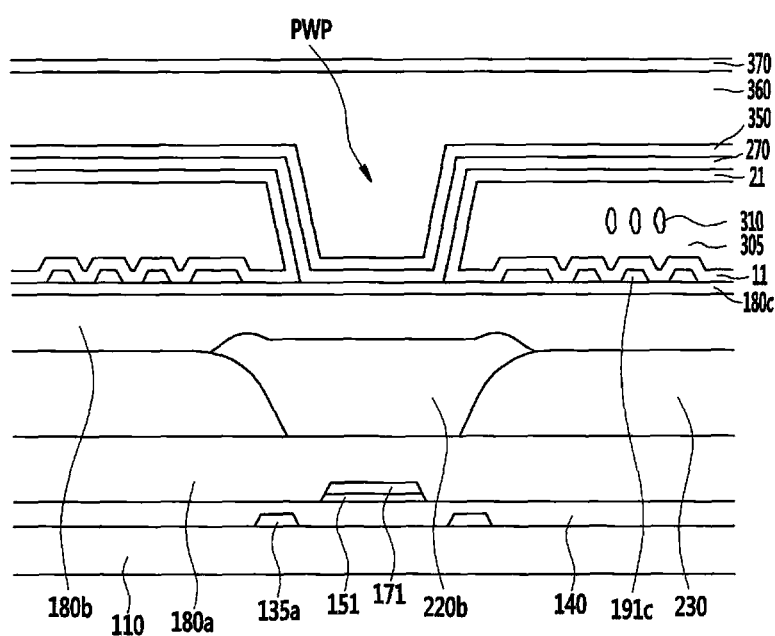

Referring to FIG. 19 and FIG. 20, the alignment layers 11 and 21 are formed on the pixel electrode 191 and the common electrode 270 by performing a baking process after injecting an aligning material including a solid content and a solvent through the injection holes 307.

Next, the liquid crystal material including the liquid crystal molecules 310 is injected into the microcavities 305 through the injection holes 307 by using an inkjet method and the like.

Thereafter, the capping layer 300 is formed on the upper insulating layer 370 to cover the injection hole 307 and the injection hole forming region 307FP to form the liquid crystal display having the configuration shown in FIGS. 2 and 3.

While embodiments have been described in connection with what is presently considered to be practical exemplary embodiments, it is to be understood that the embodiments are not limited to the disclosed embodiments, but, on the contrary, is intended to cover various modifications and equivalent arrangements included within the spirit and scope of the appended claims.

DESCRIPTION OF SYMBOLS

| 300 | sacrificial layer | | |
|---|---|---|---|
| 310 | liquid crystal molecule | 305 | microcavity |
| 307 | injection hole | 350 | lower insulating layer |
| 360 | roof layer | 370 | upper insulating layer |
| 390 | capping layer | | |

What is claimed is:
1. A liquid crystal display comprising:
a substrate;
a thin film transistor disposed on the substrate;
a first protection layer disposed on the thin film transistor;
a pixel electrode disposed on the first protection layer;

a light blocking layer disposed on the pixel electrode to cover the thin film transistor;

a second protection layer disposed on the light blocking layer; and a roof layer disposed to face the pixel electrode, wherein a plurality of microcavities having injection holes are formed between the pixel electrode and the roof layer, the microcavities comprise liquid crystal molecules, and the first protection layer and the second protection layer have different etch rates.

2. The liquid crystal display of claim 1, wherein the first protection layer and the second protection layer comprise different materials.

3. The liquid crystal display of claim 2, wherein the second protection layer has high etch selectivity as compared with the first protection layer.

4. The liquid crystal display of claim 3, wherein the first protection layer includes a silicon oxide (SiOx) and the second protection layer includes a silicon nitride (SiNx).

5. The liquid crystal display of claim 4, further comprising an interlayer insulating layer disposed between the thin film transistor and the pixel electrode, wherein the pixel electrode and the thin film transistor are connected to each other through a contact hole formed penetrating through the interlayer insulating layer and the first protection layer.

6. The liquid crystal display of claim 5, wherein the second protection layer has a wider width than that of the light blocking layer to cover the light blocking layer.

7. The liquid crystal display of claim 6, further comprising a light blocking member disposed between the thin film transistor and the interlayer insulating layer, wherein the light blocking member has an open portion corresponding to the thin film transistor.

8. The liquid crystal display of claim 7, further comprising a color filter disposed between the thin film transistor and the interlayer insulating layer.

9. The liquid crystal display of claim 1, further comprising a capping layer disposed on the roof layer to cover the injection hole.

10. The liquid crystal display of claim 1, further comprising a common electrode disposed between the microcavities and the roof layer.

11. A manufacturing method of a liquid crystal display, the method comprising:

forming a thin film transistor on a substrate;
forming a first protection layer on the thin film transistor;
forming a pixel electrode on the first protection layer;
forming a light blocking layer on the pixel electrode in cover the thin film transistor;

forming a second protection layer on the light blocking layer;

forming a sacrificial layer on the pixel electrode;
forming a roof layer on the sacrificial layer;
forming a plurality of microcavities having injection holes by removing the sacrificial layer; and
injecting a liquid crystal material into the microcavities,
wherein the first protection layer and the second protection layer have different etch rates.

12. The manufacturing method of claim 11, wherein the forming of the second protection layer includes:

forming a protection material layer on the pixel electrode to cover the light blocking layer; and patterning the protection material layer to form the second protection layer.

13. The manufacturing method of claim 12, wherein the second protection layer has high etch selectivity as compared with the first protection layer.

14. The manufacturing method of claim 13, wherein the first protection layer includes a silicon oxide (SiOx) and the second protection layer includes a silicon nitride (SiNx).

15. The manufacturing method or claim 14, further comprising forming an interlayer insulating layer between the thin film transistor and the pixel electrode, wherein the pixel electrode and the thin film transistor are connected to each other through a contact hole formed penetrating through the interlayer insulating layer and the first protection layer.

16. The manufacturing method of claim 15, wherein the second protection layer has a wider width than that of the light blocking layer to cover the light blocking layer.

17. The manufacturing method of claim 16, further comprising forming a light blocking member between the thin film transistor and the interlayer insulating layer, wherein the light blocking member is formed to have an open portion corresponding to the thin film transistor.

18. The manufacturing method of claim 17, further comprising forming a color filter between the thin film transistor and the interlayer insulating layer.

19. The manufacturing method of claim 11, further comprising forming a capping layer on the roof layer to cover the injection holes.

20. The manufacturing method of claim 11, further comprising forming a common electrode between the microcavities and the roof layer.

* * * * *